United States Patent [19]

Gunter et al.

[11] 4,349,873

[45] Sep. 14, 1982

[54] MICROPROCESSOR INTERRUPT PROCESSING

[75] Inventors: Thomas G. Gunter; John E. Zolnowsky; Lester M. Crudele, all of Austin, Tex.

[73] Assignee: Motorola, Inc., Schaumburg, Ill.

[21] Appl. No.: 136,593

[22] Filed: Apr. 2, 1980

[51] Int. Cl.³ .............................................. G06F 9/46
[52] U.S. Cl. ................................................. 364/200
[58] Field of Search ............................... 364/200, 900

[56] References Cited

U.S. PATENT DOCUMENTS

| | | | |
|---|---|---|---|
| 3,789,365 | 1/1974 | Jen et al. | 364/200 |
| 3,993,981 | 11/1976 | Cassarino, Jr. et al. | 364/200 |
| 4,001,783 | 1/1977 | Monahan et al. | 364/200 |
| 4,005,391 | 1/1977 | MacPherson | 364/200 |
| 4,020,471 | 4/1977 | Woods et al. | 364/200 |
| 4,023,143 | 5/1977 | Braunstein | 364/200 |
| 4,034,349 | 7/1977 | Monaco et al. | 364/200 |
| 4,056,847 | 11/1977 | Marcantonio | 364/200 |

*Primary Examiner*—Gareth D. Shaw
*Assistant Examiner*—David Y. Eng

*Attorney, Agent, or Firm*—Anthony J. Sarli, Jr.; Jeffrey Van Myers; Vince Ingrassia

[57] ABSTRACT

An integrated circuit data processor receives interrupt level signals from external circuitry which represent a priority level associated with the external circuitry. These signals are compared with signals representing the current operating level of the processor, and an interrupt pending output is generated if (1) the priority level is higher than the operating level; or (2) a maximum priority level is received. Upon the occurrence of the interrupt pending output, the current instruction program is interrupted, and an instruction program associated with the external circuitry is executed. The processor transmits a signal back to the external circuitry indicating that the interrupt request has been granted and receives a vector number from the external circuitry. A first acknowledgment signal from the external circuitry causes the vector number to be latched in the processor. A second acknowledgment signal from the external circuitry causes a vector to be internally generated. Error circuitry is provided to detect spurious interrupts.

4 Claims, 24 Drawing Figures

FIG 6

| 15 | 14 | 13 | 12 | 11 | 10 | 9 | 8 | 7 | 6 | 5 | 4 | 3 | 2 | 1 | 0 |
|----|----|----|----|----|----|---|---|---|---|---|---|---|---|---|---|
| T  | S  |    |    |    |    |   |   |   |   | X | N | Z | V | C |

FIG 8

| D15 | | | | | | | | D8 | D7 | | | | | | | D0 |
|---|---|---|---|---|---|---|---|---|---|---|---|---|---|---|---|---|
| IGNORED | | | | | | | | | v7 | v6 | v5 | v4 | v3 | v2 | v1 | v0 |

FIG 9

| A23 | ... | A11 | A10 | A9 | A8 | A7 | A6 | A5 | A4 | A3 | A2 | A1 | A0 |
|-----|-----|-----|-----|----|----|----|----|----|----|----|----|----|----|
| ALL ZEROES | | | v7 | v6 | v5 | v4 | v3 | v2 | v1 | v0 | 0 | 0 | 0 |

| VECTOR NUMBER(S) | ADDRESS | | | ASSIGNMENT |
|---|---|---|---|---|
| | DEC | HEX | SPACE | |
| 0 | 0 | 000 | SP | RESET: INITIAL SSP |
| | 4 | 004 | SP | RESET: INITIAL PC |
| 2 | 8 | 008 | SD | BUS ERROR |
| 3 | 12 | 00C | SD | ADDRESS ERROR |
| 4 | 16 | 010 | SD | ILLEGAL INSTRUCTION |
| 5 | 20 | 014 | SD | ZERO DIVIDE |
| 6 | 24 | 018 | SD | CHK INSTRUCTION |
| 7 | 28 | 01C | SD | TRAPV INSTRUCTION |
| 8 | 32 | 020 | SD | PRIVILEGE VIOLATION |
| 9 | 36 | 024 | SD | TRACE |
| 10 | 40 | 028 | SD | LINE 1010 EMULATOR |
| 11 | 44 | 02C | SD | LINE 1111 EMULATOR |
| 12 | 48 | 030 | SD | (UNASSIGNED, RESERVED) |
| 13 | 52 | 034 | SD | (UNASSIGNED, RESERVED) |
| 14 | 56 | 038 | SD | (UNASSIGNED, RESERVED) |
| 15 | 60 | 03C | SD | (UNASSIGNED, RESERVED) |
| 16-23 | 64 | 040 | SD | (UNASSIGNED, RESERVED) |
| | 95 | 05F | | - |
| 24 | 96 | 060 | SD | SPURIOUS INTERRUPT |
| 25 | 100 | 064 | SD | LEVEL 1 INTERRUPT AUTO-VECTOR |
| 26 | 104 | 068 | SD | LEVEL 2 INTERRUPT AUTO-VECTOR |
| 27 | 108 | 06C | SD | LEVEL 3 INTERRUPT AUTO-VECTOR |
| 28 | 112 | 070 | SD | LEVEL 4 INTERRUPT AUTO-VECTOR |
| 29 | 116 | 074 | SD | LEVEL 5 INTERRUPT AUTO-VECTOR |
| 30 | 120 | 078 | SD | LEVEL 6 INTERRUPT AUTO-VECTOR |
| 31 | 124 | 07C | SD | LEVEL 7 INTERRUPT AUTO-VECTOR |
| 32-47 | 128 | 080 | SD | TRAP INSTRUCTION VECTORS |
| | 191 | 0BF | | - |
| 48-63 | 192 | 0C0 | SD | (UNASSIGNED, RESERVED) |
| | 255 | 0FF | | - |
| 64-255 | 256 | 100 | SD | USER INTERRUPT VECTORS |
| | 1023 | 3FF | | - |

FIG 10

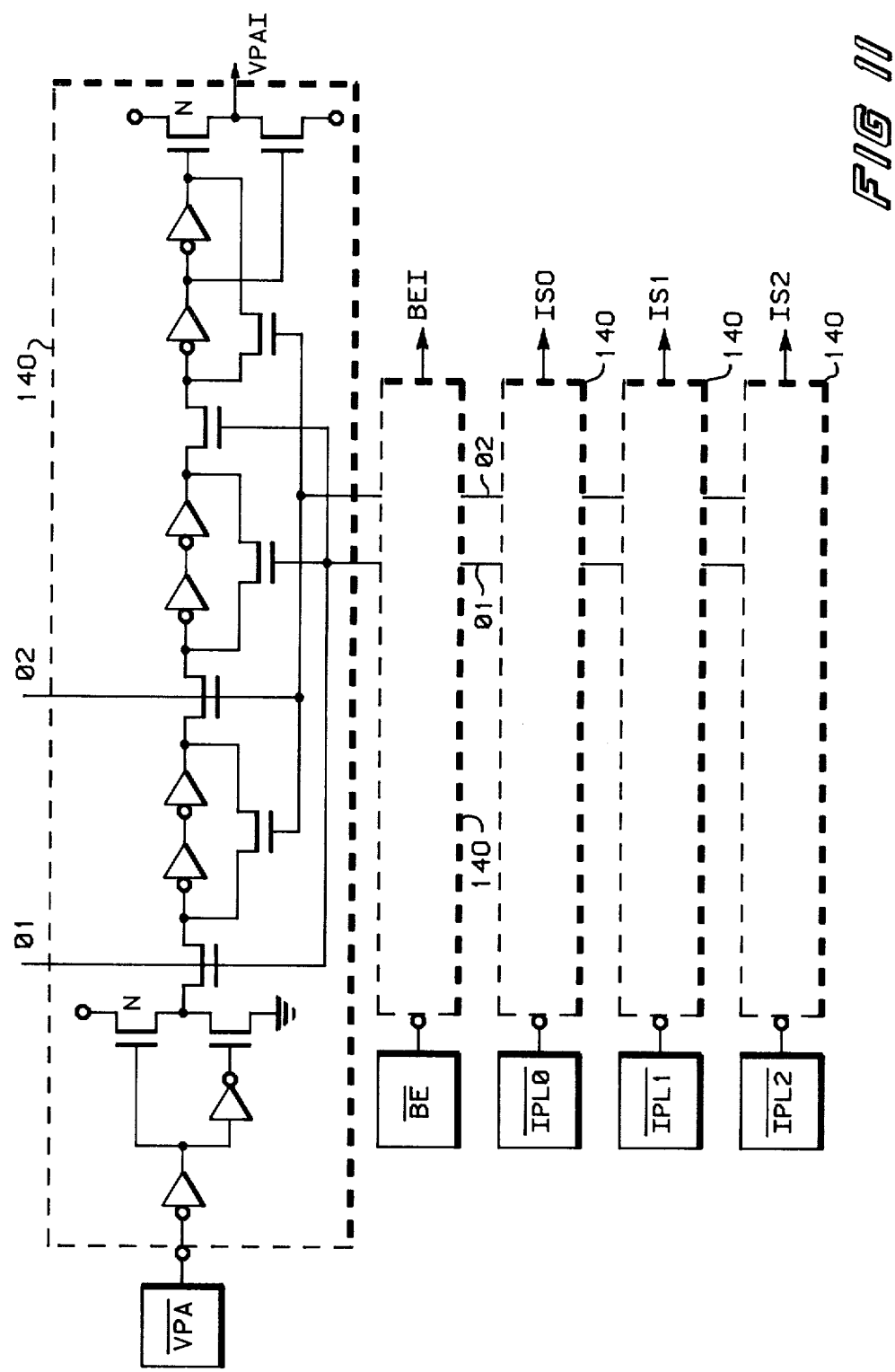

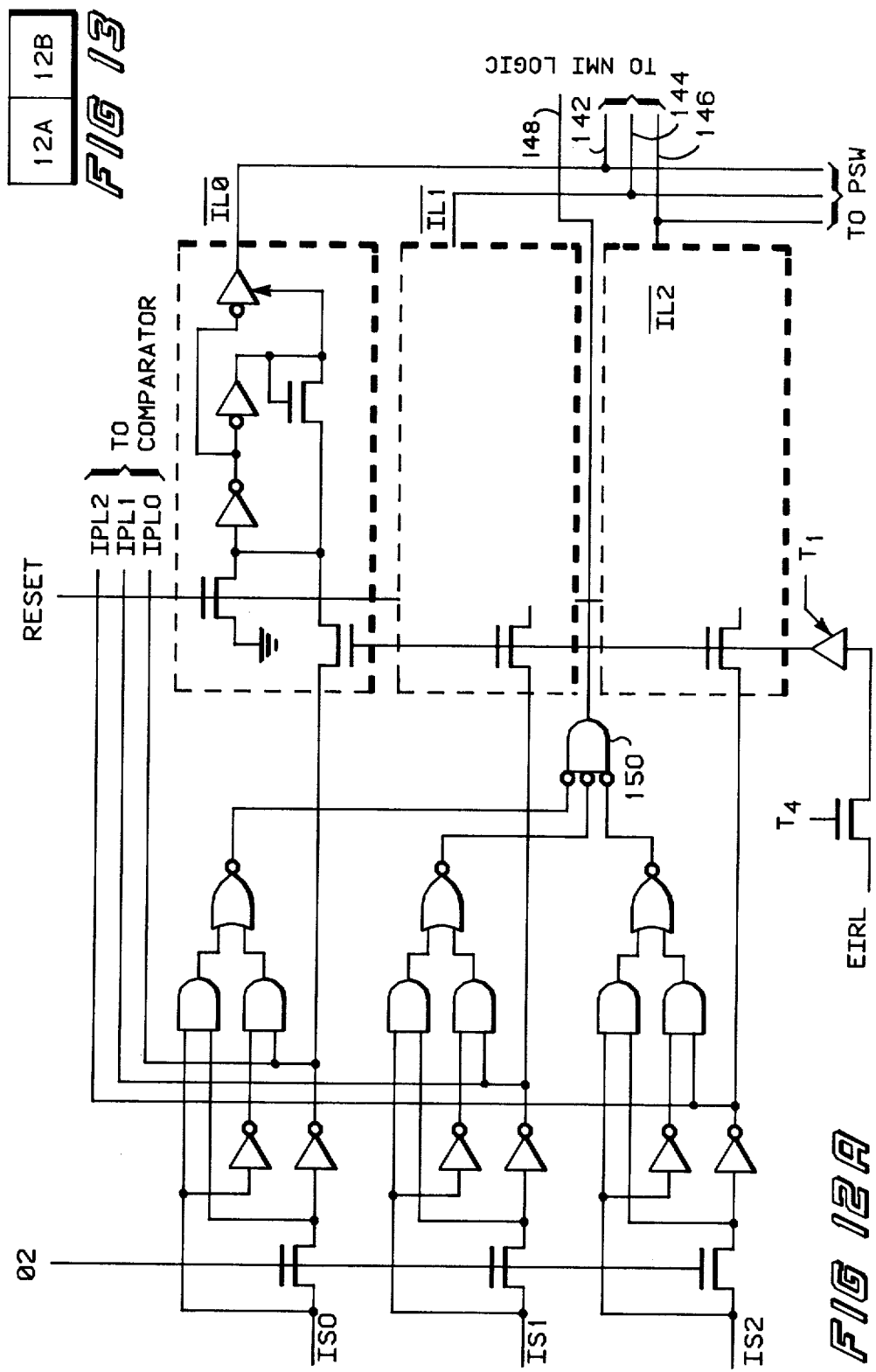

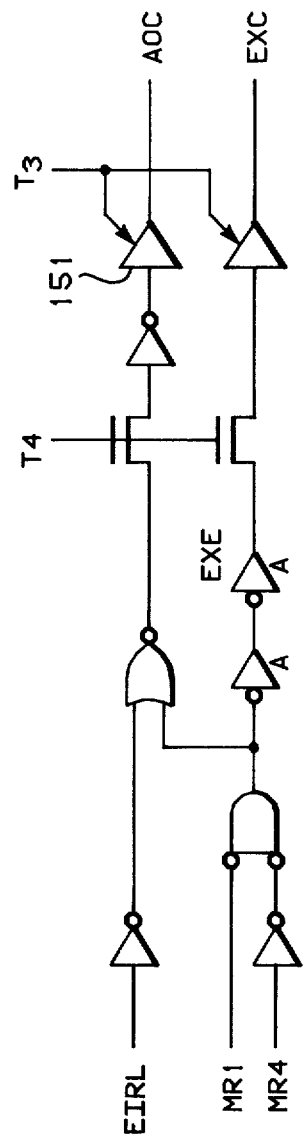

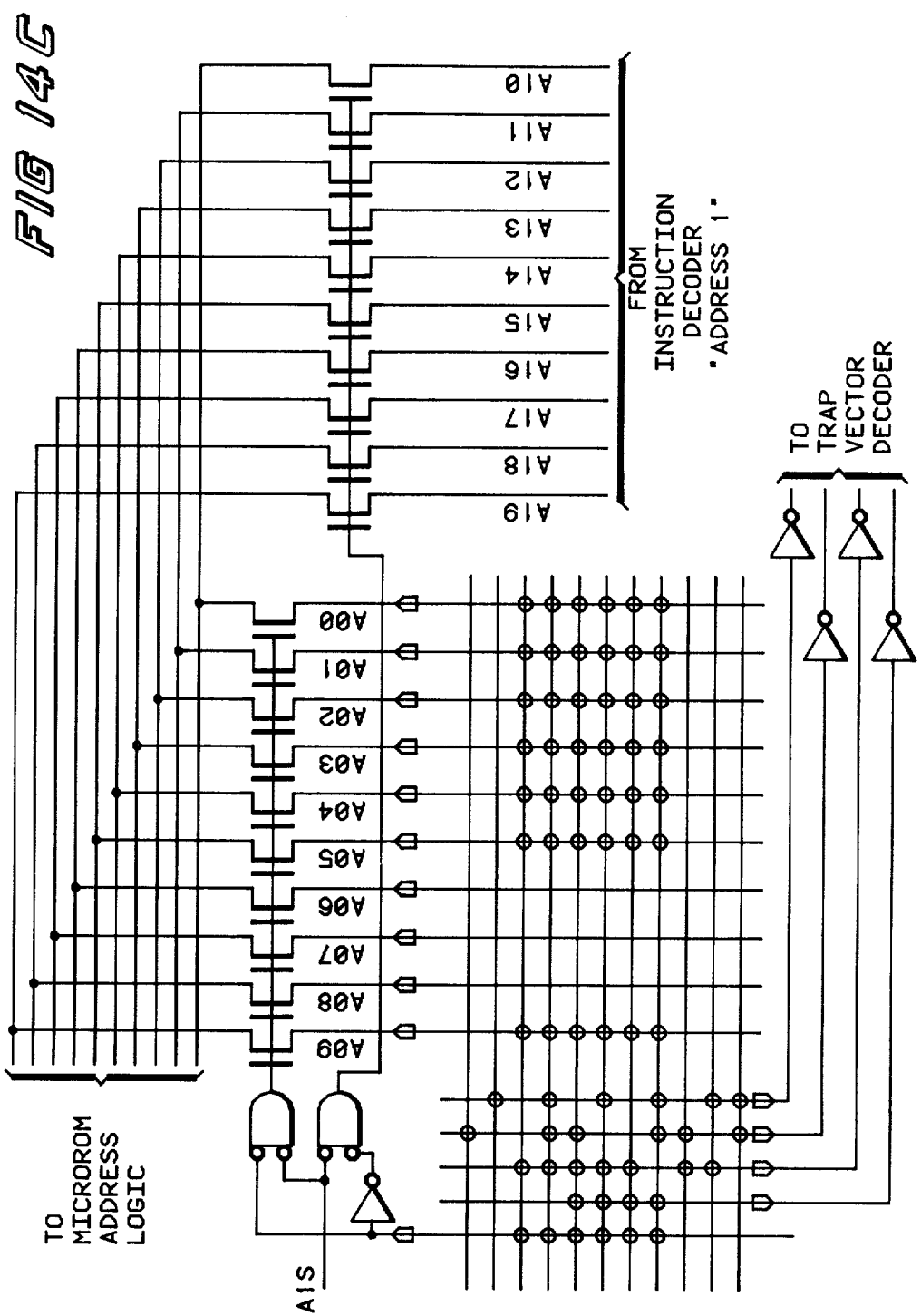

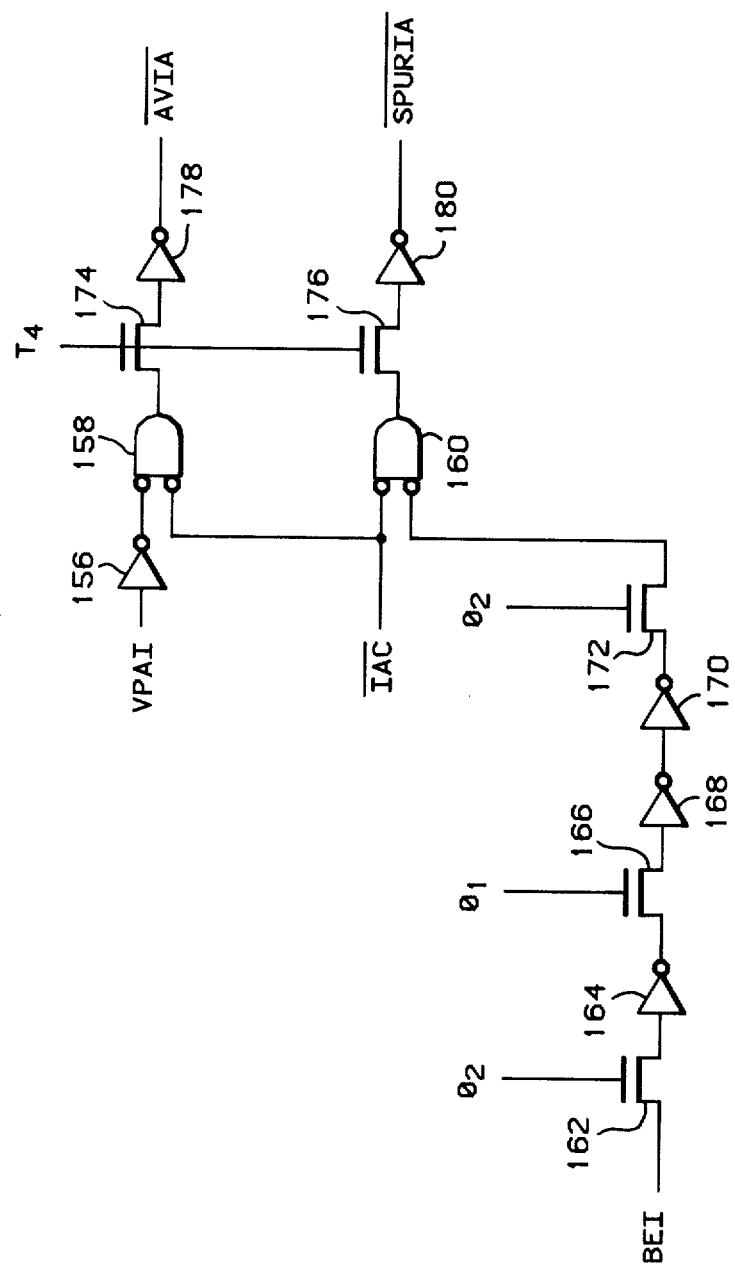

MICROPROCESSOR INTERRUPT PROCESSING

CROSS REFERENCE TO RELATED APPLICATIONS

1. "Microprogrammed Control Apparatus for Data Processor", invented by Tredennick et al., bearing Ser. No. 961,796, filed Nov. 17, 1978 and assigned to the assignee of the present invention.

2. "Execution Unit for Data Processor Using Segmented Bus Structure" invented by Gunter et al., bearing Ser. No. 961,798, filed Nov. 17, 1978, and assigned to the assignee of the present invention.

3. "Two Level Control Store for Microprogrammed Data Processor" invented by Gunter et al., bearing Ser. No. 041,135, filed May 21, 1979, and assigned to the assignee of the present invention.

4. "Conditional Branch Unit for Microprogrammed Data Processor" invented by Tredennick et al., bearing Ser. No. 041,201, filed May 21, 1979, and assigned to the assignee of the present invention.

5. "ALU and Condition Code Control Unit for Data Processor" invented by Hobbs et al., bearing Ser. No. 041,203, filed May 21, 1979, and assigned to the assignee of the present invention.

6. "Instruction Register Sequence Decoder for Microprogrammed Data Processor" invented by Tredennick et al., bearing Ser. No. 041,202, filed May 21, 1979, and assigned to the assignee of the present invention.

7. "Bus Error Recognition for Microprogrammed Data Processor" invented by Gunther et al., bearing Ser. No. 136,845, filed of even date herewith and assigned to the assignee of the present invention.

BACKGROUND OF THE INVENTION

This invention relates generally to data processors and, more particularly, to a method and apparatus for processing vectored, non-vectored, and spurious interrupts in substantially the same manner and using substantially the same hardware.

DESCRIPTION OF THE PRIOR ART

Recent improvements in MOS semiconductor technology have resulted in advances in large scale integrated circuit microprocessors. The latest generation of LSI microprocessors is an order of magnitude more powerful than the previous generation introduced three or four years ago. The latest generation of microprocessors have 16 bit data paths and 16 bit arithmatic capability and they directly address multiple-megabyte memories. In terms of functional capability and speed, they will out-perform all but the high-end models of current 16 bit minicomputers.

LSI microprocessor design is now at the stage where better implementation techniques are required in order to control complexity and meet tight design schedules. One technique for achieving these goals is to use microprogramming for controlling the processing. Most of the traditionally claimed benefits of microprogramming, for example regularity (to decrease complexity), flexibility (to ease design changes), and reduced design costs, apply to the implementation problems for current LSI microprocessor design.

Most microprocessors are equipped with a terminal via which external logic can demand the attention of the microprocessor system. The signal is commonly referred to as an interrupt request signal since the external logic is asking the microprocessor to interrupt whatever it is currently doing in order to service more pressing external logic needs. The processor services the interrupt by suspending whatever it is doing, processing the data which is associated with the interrupt, and then carrying on with its suspended operations. The key characteristic of an interrupt is that it is an unscheduled event.

Upon receipt of an interrupt, a microprocessor system performs the following functions or equivalents thereof. First, the microprocessor will generate an interrupt acknowledge signal. Second, the microprocessor saves the contents of various status flags, accumulator register, data counter, program counter etc. Third, the contents of an interrupt address vector is moved to the program counter. Most microprocessors receive fixed interrupt address vectors from the interrupting external logic circuitry since most microprocessors are used in dedicated, non-varying situations where only a few specific interrupts will require equally specific responses from the microprocessor system. However, some peripheral devices are not adapted to transmit a vector number in response to an interrupt acknowledgment by the microprocessor. Further, the possibility exists that a spurious interrupt may occur.

It should be appreciated, that several interrupts having different origins may be received at the same time and it must be determined which of these interrupts is to be serviced first. This problem of priority can be resolved by dedicating a specific number of interrupt request lines with ascending priorities. This requires the dedication of a group of input/output pins on the microprocessor package. For this reason, it is generally unacceptable.

SUMMARY OF THE INVENTION

It is the object of the present invention to provide a data processor which utilizes new and improved interrupt processing apparatus.

It is the further object of the present invention to provide a data processor which can receive and process vectored, non-vectored and spurious interrupts.

It is the further object of the present invention to provide a data processor which processes vectored, non-vectored and spurious interrupts using a common handling routine.

According to one aspect of the invention there is provided an integrated circuit data processor for executing operations upon digital information in response to a plurality of instruction programs, comprising: first means for receiving interrupt level signals from circuitry external to the data processor, the interrupt level signals representing a priority level associated with the external circuitry, the interrupt level signals being suitable for representing a condition of highest priority as well as conditions of less than highest priority; second means for storing operating level signals representative of a priority level associated with an instruction program currently being executed by the data processor; third means coupled to the first means and to the second means, the third means being responsive to the received interrupt level signals for generating an output signal when the received interrupt level signals are of a higher priority than the operating level signals stored by the second means, the third means also generating an output signal when the interrupt level signals change from a condition of less than highest priority to a condition of highest priority regardless of the operating level signals stored by the second means; and fourth means coupled to the third means and responsive to the output signal for interrupting the execution of the instruction program currently being executed by the data processor in order to execute an instruction program associated with the external circuitry from which the interrupt level signals were received.

According to a further aspect of the invention there is provided a data processor for executing operations upon digital information in response to a plurality of instruction programs, comprising: a first digital port adapted for coupling to circuitry external to the data processor for receiving a vector number; first means coupled to the external circuitry for receiving interrupt signals from the external circuitry, the interrupt signals representing a request by the external circuitry to interrupt the execution of an instruction program currently being executed by the data processor; second means coupled to the first means and responsive to the interrupt signals, the second means having an output coupled to the external circuitry for providing a granting signal to the external circuitry for indicating that the interrupt request is granted; third means having an input coupled to the external circuitry for receiving a first acknowledgment signal, said third means being responsive to the first acknowledgment signal for latching the vector number received by the first digital port; fourth means having an input coupled to the external circuitry for receiving a second acknowledgment signal, the fourth means being responsive to the second acknowledgment signal for providing a vector number independent of the vector number received by the first digital port; and fifth means coupled to the third and fourth means and responsive to the vector number latched by the third means and responsive to the vector number provided by the fourth means for generating a vector address associated with the external circuitry which requested the interrupt.

According to a still further aspect of the invention there is provided a data processor for executing operations upon digital information in response to a plurality of instruction programs, comprising: first means coupled to external circuitry for receiving interrupt signals from the external circuitry, the interrupt signals representing a request by the external circuitry to interrupt the execution of an instruction program currently being executed by the data processor; second means coupled to the first means and responsive to the interrupt signal, the second means having an output coupled to the external circuitry for providing a granting signal to the external circuitry for indicating that the interrupt request is granted; third means having an input coupled to the external circuitry, for receiving an acknowledgment signal from the external circuitry in response to the granting signal; and error circuitry coupled to the second and third means and responsive to the absence of an acknowledgment signal from the external circuitry after a granting signal has been provided for generating a spurious interrupt signal, the data processor being responsive to the spurious interrupt signal for executing an instruction program associated with the occurrence of the spurious interrupt signal.

The above and other objects, features and advantages of the present invention will be more clearly understood from the following detailed description taken in conjunction with the accompanying drawings, in which:

BRIEF DESCRIPTION OF THE DRAWINGS

FIG. 6 illustrates the format of the PSW register shown in FIG. 5;

FIG. 8 illustrates vector number format;

FIG. 9 illustrates the format of the address derived from a vector number;

FIG. 10 illustrates the assignment of vector numbers and exception condition addresses;

FIG. 11 is a partial schematic diagram of a portion of the synchronizing circuitry;

FIGS. 12A and 12B illustrate the circuitry for generating the IPEND signal;

FIG. 13 illustrates the proper orientation of FIGS. 12A and 12B;

FIGS. 14A, 14B, and 14C illustrate a portion of the exception priority logic which updates the exception priority register;

FIG. 15 illustrates the proper orientation of FIGS. 14A, 14B and 14C;

FIG. 16 is a logic diagram illustrating the contents of decoder 86 shown in FIG. 2;

DESCRIPTION OF THE PREFERRED EMBODIMENT

Figure 1:
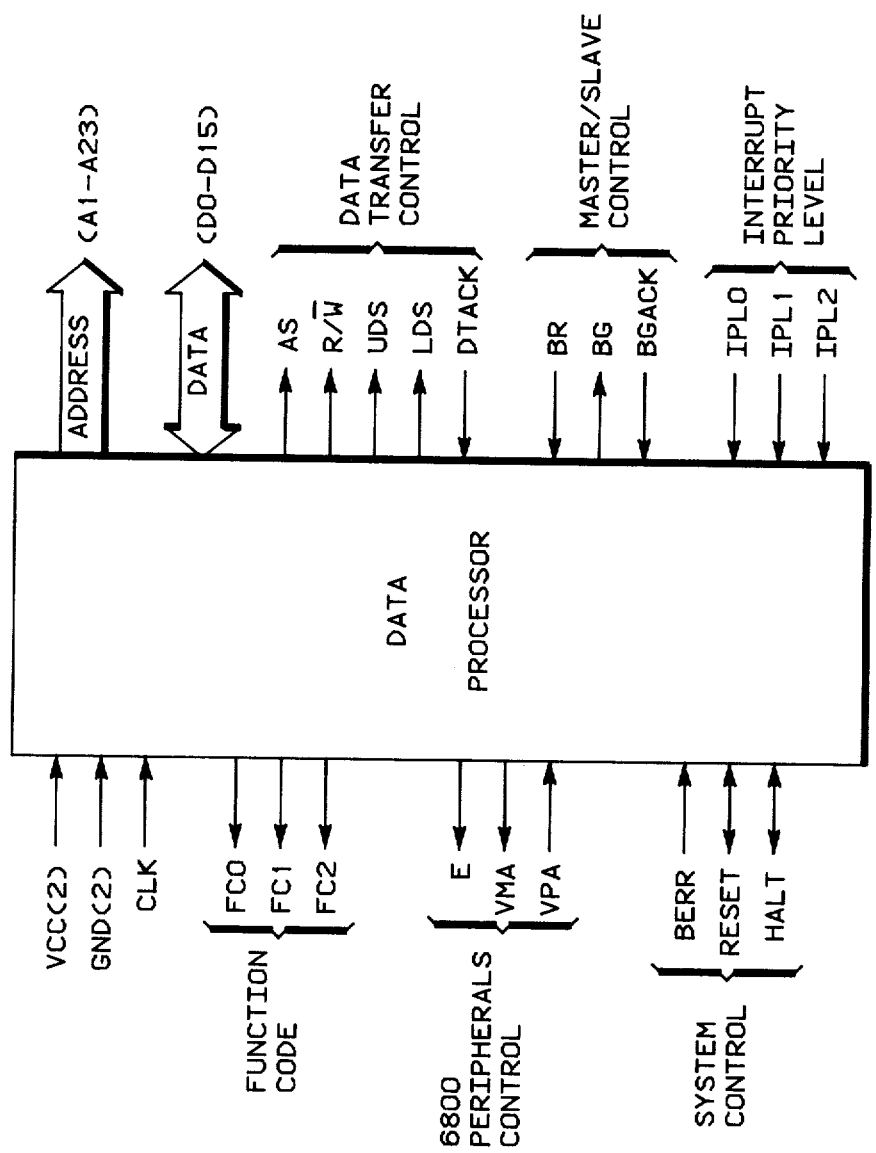
FIG. 1 is a block diagram of a microprocessing system according to the present invention illustrating the input/output signals involved.

FIG. 1 is a block diagram of a data processor according to a preferred embodiment of the present invention and illustrates the input/output signals employed by the data processor for communication with external circuitry. Address leads A1-A23 provide a 23 bit output address. Thus, the data processor is capable of addressing 16,777,216 locations. Data leads D0-D15 provide a bidirectional 16 bit data path between the data processor and the external circuitry.

In FIG. 1, a first group of control leads has been labeled DATA TRANSFER CONTROL. Control lead AS provides an address strobe output which indicates that a valid address is on the address bus (A1-A23) and also indicates that external circuitry should not attempt to place a different address on the address bus at this time. Control lead R/W is an output which indicates to the external circuitry whether the current data transfer is a read or a write operation. During a read operation, the data processor receives data from external circuitry. During a write operation, the data processor transmits data to external circuitry. Control leads UDS and LDS are data strobe output signals which indicate to the external circuitry whether a byte or a word data transfer is to occur. When LDS is enabled, the least significant byte (8 bits) of the data bus D0-D7 is involved in the data transfer. Similarly, when UDS is enabled, the most significant byte of the data bus D8-D15 is involved in the data transfer. A word type data transfer will result in both UDS and LDS being enabled. Control lead DTACK is an input terminal which receives a signal from the external circuitry indicating to the data processor that the external circuitry acknowledges the data transfer operation initiated by the data processor, thereby allowing for asynchronous data transfers between the data processor and the external circuitry.

Another group of control leads shown in FIG. 1 is labeled MASTER/SLAVE CONTROL. This group of control leads is used in the event that circuitry external to the data processor is to take control of the system bus. Control lead BR is an input signal which receives a bus request signal from the external circuitry. Control lead BG is an output signal which provides a bus grant signal to the external circuitry which indicates that the data processor will allow control of the system bus to be transferred to the external circuitry. Finally, control lead BGACK is an input terminal which receives a bus grant acknowledge signal from the external circuitry for acknowledging that control over the system bus will be assumed by the external circuitry.

Another group of control leads in FIG. 1 is labeled INTERRUPT PRIORITY LEVEL. Three control leads (IPL0, IPL1 and IPL2) are each input terminals which receive a three bit interrupt signal from external circuitry for indicating to the data processor that an external peripheral device is requesting interrupt. The interrupt priority level signals also indicate the relative priority of this interrupt request.

The data processor shown in FIG. 1 includes power supply terminals for coupling the data processor to a supply voltage ($V_{CC}$) and for coupling the data processor to ground potential (GND). The data processor also includes an input terminal for receiving a clock signal (CLK) which synchronizes operations within the data processor.

Another group of control leads in FIG. 1 has been labeled FUNCTION CODE. These three output terminals (FC0, FC1 and FC2) provide external circuitry with information regarding the function of the current bus cycle. For example, these three output signals can distinguish between a data transfer involving an instruction program space and a data space within the overall address space. Also, these signals can distinguish between a data transfer occurring during normal execution and a data transfer occurring during an interrupt acknowledge cycle.

Another group of control leads shown in FIG. 1 have been labeled 6800 PERIPHERALS CONTROL. The function of these control leads is to permit data transfers between the data processor and peripheral devices of the type within the M6800 family of microprocessor circuits generally available from Motorola, Inc. Output lead E provides an enable clock signal which is required by the M6800 type peripheral devices. Control lead VMA provides a valid memory address output signal for indicating to M6800 type peripheral devices that a valid memory address is on the address bus. Control leads VPA receives a valid peripheral address signal from external circuitry confirming that an M6800 compatible address space has been addressed by the data processor. As will be explained below, the VPA signal might also be used during an interrupt acknowledge cycle causing the data processor to generate a vector address.

Finally, another group of control leads in FIG. 1 has been labeled SYSTEM CONTROL. Control lead BERR receives a signal from external circuitry indicating that a problem has occurred during the bus cycle currently being executed. For example, a bus error occurs when the data processor initiates a data transfer operation by asserting control signal AS and none of the external devices acknowledges the data transfer (i.e. DTACK is not asserted after an allotted amount of time). Also, a bus error occurs when the data processor initiates an interrupt acknowledge cycle and none of the peripheral devices respond within an allotted period of time. An attempted access by the data processor of a portion of the address space which a particular user is restricted from accessing will also result in a bus error.

Control lead RESET is a bidirectional terminal which has two basic modes of operation. In an input mode, receipt of a RESET signal will cause a data processor to execute an initiation sequence located in a predetermined area of the address space. This mode of reset operation may occur upon initial application of the power supply to the data processor or subsequently by an externally generated reset signal. In the output mode, the data processor can generate a reset signal as an output signal for initializing external circuitry in response to the execution of a software reset instruction. Finally, control lead HALT is a bidirectional terminal which has input and output modes of operation. In the input mode of operation, the presence of the HALT signal stops the data processor after completion of the current bus cycle. Proper manipulation of the HALT signal can allow for single bus cycle operation. With the exception of the MASTER/SLAVE CONTROL signals, all of the data processor output terminals assume a passive mode and all control signals are inactive during the HALT mode of operation. During the output mode of operation, the data processor itself can force the HALT terminal to a low logic level in certain instances. For example, the data processor will force the HALT terminal to a low level if, in response to a first bus error, a second bus error is generated when the data processor attempts to store processor status information in an address space known as a stack. If a bus error occurs on the first stacking operation, there have been two bus errors in a row or a double bus fault. When a double bus fault occurs, the processor will halt.

Figure 2:
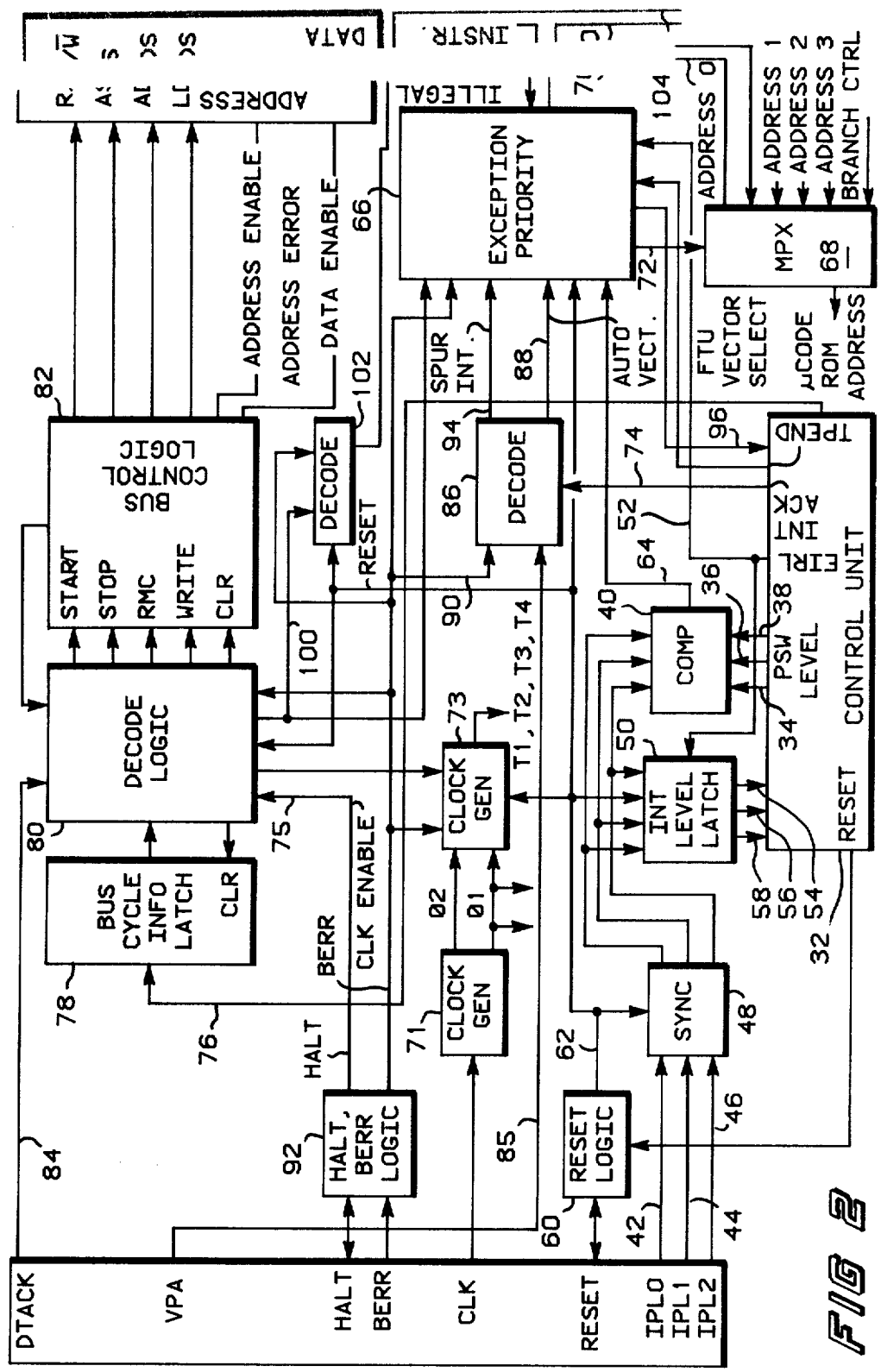
FIG. 2 is a block diagram of the apparatus for controlling interrupts.

FIG. 2 is a block diagram which illustrates, in abbreviated form, the apparatus for controlling interrupts. The control unit for the data processor is shown as block 32 in FIG. 2 and is more fully described in co-pending U.S. patent application Ser. No. 041,135 entitled "Two-Level Control Store For Microprogrammed Data Processor", filed May 21, 1979, assigned to the assignee of the present invention, and incorporated herein by reference. Control unit 32 includes a processor status word (PSW) multiple bit register which includes three bits representing the current processor operating level. These three bits (PSWI2, PSWI1 and PSWI0) may range from "000" (operating level 0) to "111" (operating level 7) which is the highest operating level. The three bit operating level stored by the PSW register is coupled by conductors 34, 36 and 38 to comparator (COMP) 40. The function of comparator 40 is to detect an interrupt request of a higher priority level than a current data processor operating level. In addition, comparator 40 detects nonmaskable interrupts at priority level 7. Further details concerning the operation and implementation of comparator 40 will be described below.

The function of interrupt priority level inputs IPL0, IPL1 and IPL2 was briefly discussed above in conjunction with FIG. 1. These input terminals are coupled by conductors 42, 44 and 46 to SYNC block 48 which samples and synchronizes the input signals received by the interrupt priority level input terminals. The output of SYNC block 48 is coupled to comparator 40 and to interrupt level latch 50. The three bit input to interrupt level latch 50 is sampled at each macroinstruction boundary in order to store the status of the interrupt priority level input signals. In the preferred embodiment, control unit 32 is microprogrammed such that each macroinstruction is executed by performing a series of microinstructions stored in a control store. Macroinstruction boundaries occur following the execution of the last microinstruction for a previous macroinstruction and before the execution of a first microinstruction for a subsequent macroinstruction. The last microinstruction in each microinstruction routine causes control unit 32 to assert a control signal EIRL to indicate macroinstruction boundaries. Control signal EIRL is conducted by conductor 52 which is coupled to interrupt level latch 50 to enable sampling of the interrupt level at macroinstruction boundaries. The three bit latched output of interrupt level latch 50 is coupled to control unit 32 by conductors 54, 56 and 58. Conductors 54, 56 and 58 are coupled to the inputs of PSW register bits such that the operating level of the processor can be updated with the latched interrupt priority level whenever the interrupt is recognized by the data processor. Interrupt level latch 50 is also coupled to reset logic 60 by conductor 62 such that the three bit contents of the interrupt level latch 50 are forced to the lowest priority level (all zeros) when a reset operation is performed. PSW register bits PSWI0, PSWI1 and PSIWI2 are forced to all ones.

The output of comparator 40 is coupled by conductor 64 to exception priority block 66 in order to indicate that an interrupt is pending. Conductor 52 is also coupled to exception priority block 66, and signal EIRL indicates a macroinstruction boundary at which time a pending interrupt can be acknowledged.

Exception priority block 66 is coupled to multiplexer 68 by a plurality of conductors designated 70 and labeled "ADDRESS 0" in FIG. 2. When an interrupt is pending at a macroinstruction boundary, "ADDRESS 0" corresponds to a starting address in the microcontrol store which initiates a microinstruction routine corresponding to an interrupt acknowledge sequence. Exception priority block 66 is also coupled to multiplexer 68 by lines designated 72. When an interrupt is pending at a macroinstruction boundary, a control signal conducted by line 72 selects "ADDRESS 0" rather than "ADDRESS 1" as the starting address for the next microinstruction sequence. The output of multiplexer 68 is coupled to an input of the microcontrol store in order to select the next microinstruction. Further details of multiplexer 68 are provided in copending U.S. Pat. application Ser. No. 041,202 entitled "Instruction Register Sequence Decoder for Microprogrammed Data Processor and Method", filed May 21, 1979 and assigned to the assignee of the present invention.

Upon initiation of the microinstruction routine specified by "ADDRESS 0", an interrupt acknowledge sequence occurs. Control unit 32 decodes function code bits FC0, FC1 and FC2 and causes conductor 74 to assert a high level to indicate an interrupt acknowledge sequence. Control unit 32 is coupled by lines designated 76 to BUS CYCLE INFO LATCH 78 in order to initiate a bus cycle for obtaining an interrupt vector number. Decode logic 80 is coupled to latch 78 for generating bus control signals which are coupled to BUS CONTROL LOGIC 82. BUS CONTROL LOGIC 82 generates the data transfer control output signals (AS, R/W, UDS, LDS) already mentioned in the discussion of FIG. 1. In addition, ADDRESS ENABLE and DATA ENABLE are generated and control the output drivers coupled to the address bus and data bus respectively.

During the bus cycle, the data processor asserts the address strobe signal (AS) and the interrupt level stored by interrupt level latch 50 is placed on the three least significant bits (A1, A2 and A3) of the address bus. This features allows the data processor to identify the priority level of the interrupt which is being recognized such that the proper peripheral device responds with its vector number during the interrupt acknowledge bus cycle. The read/write (R/W) bit is set to indicate a read mode and the function code output signals mentioned in connection with FIG. 1 (FC0, FC1 and FC2) are set to indicate an interrupt acknowledge bus cycle. Also, the lower data strobe (LDS) is asserted to indicate to the interrupting peripheral device that it should place its vector number on the least significant 8 bits of the data bus.

Figure 3:
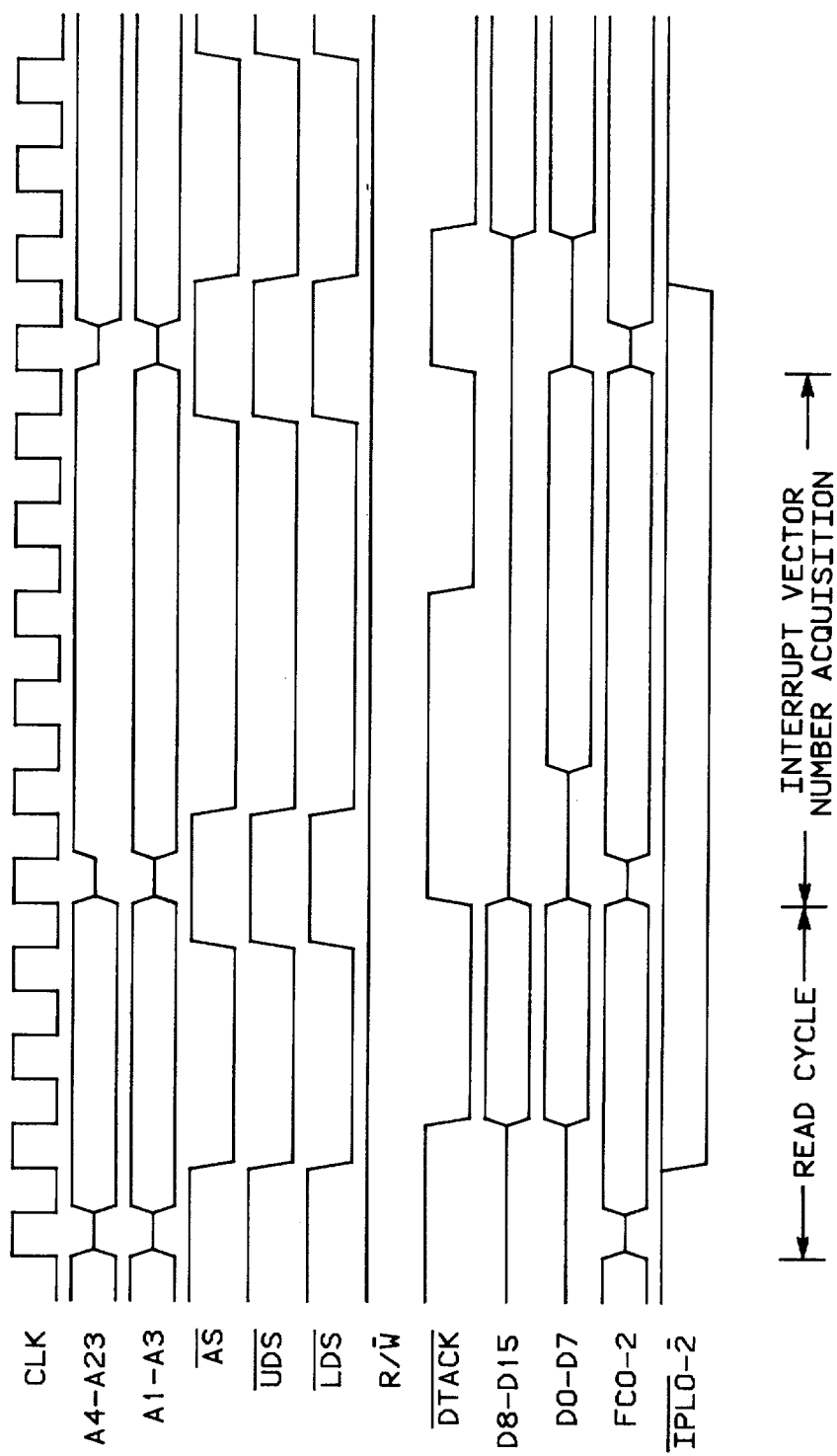
FIG. 3 is a timing diagram illustrating a vectored interrupt acknowledge cycle.

For peripheral devices which make use of vectored interrupts, the peripheral devices will place its vector number on the least significant 8 bits of the data bus and assert the data transfer acknowledge signal (DTACK). The DTACK input terminal of the data processor is coupled by conductor 84 to decode logic 80. Upon receipt of the DTACK signal, decode logic 80 causes the vector number to be latched into the data bus input buffers of the data processor, and also negates the AS and LDS signals. In response to the negation of the AS signal, the interrupting peripheral device will negate the DTACK signal, and the processor then proceeds to turn control over to the macroinstruction coding specified by the interrupt vector number. FIG. 3 illustrates the timing relationships which exist between the above referred to signals during a vectored interrupt acknowledge cycle.

With respect to vectored interrupts, the term "vectored" is used because the interrupting peripheral device specifies a pointer to the actual service routine, not the address of the service routine itself. To do this, a table of vectors is built into the address space. Each entry in the table contains the starting address of the service routine to be executed. Each vector table entry is 4 bytes (32 bits) long. Each entry starts on a double word boundary; i.e., the least three significant bits of the address are all "0".

The vector table is 1,024 bytes long. It starts at address "0" and proceeds through address "1023". This provides 256 unique vectors. The actual vector table entries are selected by building an address from the 8 bits of data (vector number) received from the peripheral device during the interrupt acknowledge sequence.

Some peripheral devices, particularly those designed to be compatible with the MC6800 microprocessor available from Motorola, Inc,, are not adapted to transmit a vector number in response to acknowledgment by the data processor of a pending interrupt. In this event, the data processor operates in an auto-vectored interrupt mode. During the interrupt acknowledge bus cycle, the interrupting peripheral asserts control signal VPA rather than the DTACK control signal. When received by the data processor, control signal VPA is conducted by line 85 to decode block 86. Decode block 86 is also coupled to conductor 74 for receiving the interrupt acknowledge signal.

Figure 4:
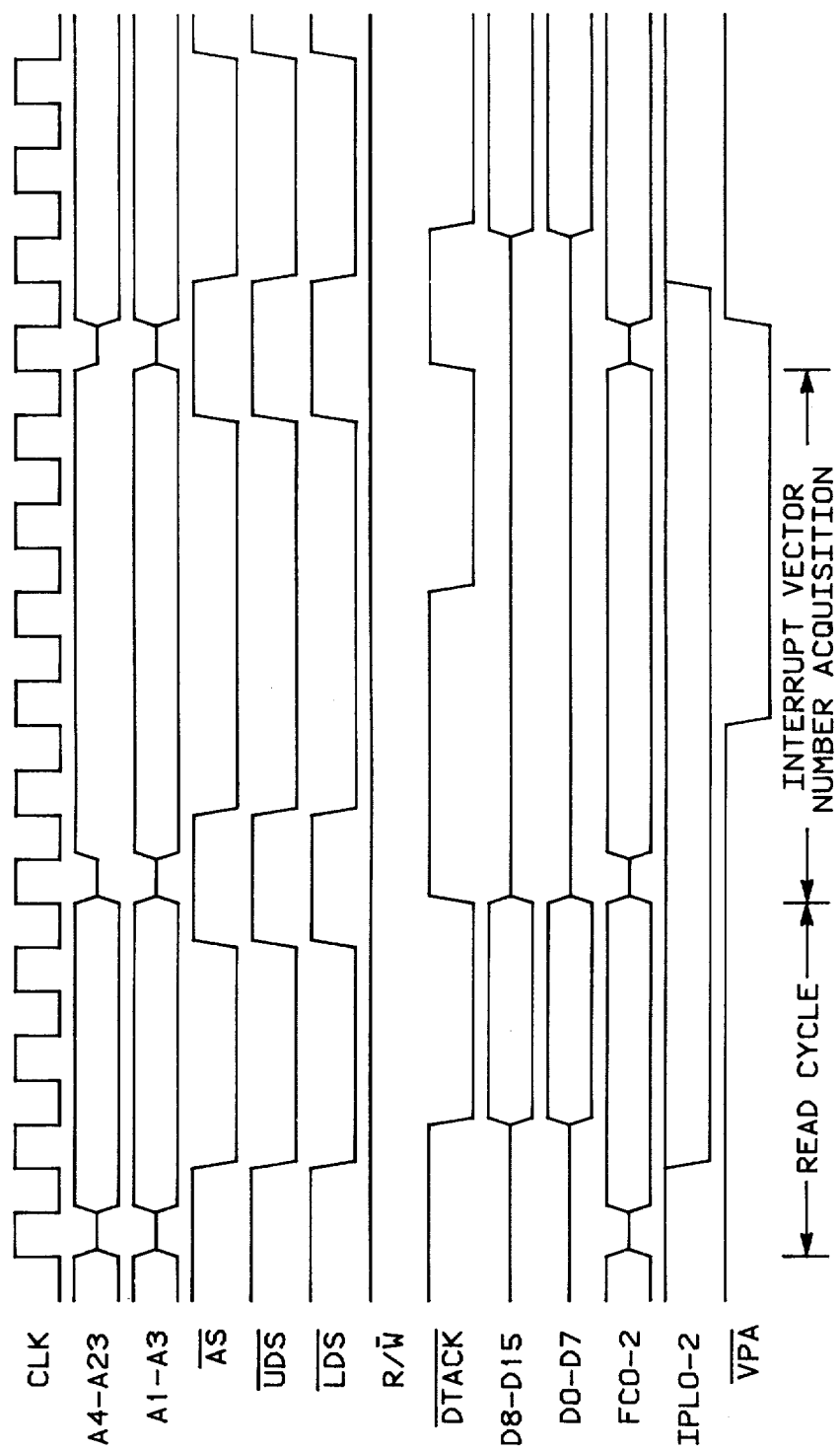
FIG. 4 is a timing diagram illustrating an auto-vector interrupt acknowledge cycle.

Decode block 86 has a first output which is coupled by conductor 88 to exception priority block 66. Whenever VPA and interrupt acknowledge signal are active at the same time, the output of decode block 86, coupled to conductor 88, is a logic "1" which indicates the autovector mode. In this event, the vector number is internally defined as a function of the interrupt level of the peripheral which requested the interrupt. Therefore, there are seven unique vector numbers associated with the auto-vectors generated from the interrupt acknowledge-VPA interaction. When VPA is active during an interrupt acknowledge cycle, the data processor ignores the data on the data bus. If an auto-vectored interrupt is indicated, exception priority block 66 generates a new "ADDRESS 0" on lines 70 which is selected by multiplexers 68 for directing the control store to a new microinstruction routine for internally generating the vector number. FIG. 4 illustrates the timing relationships which exist during an auto-vector interrupt acknowledge cycle as described above.

Decode block 86 also receives a bus error signal on conductor 90 from HALT, BERR LOGIC block 92. Logic block 92 is coupled to the external BERR input terminal mentioned in connection with FIG. 1. Decode block 86 includes a second output which is coupled by conductive 94 to exception priority block 66. As mentioned previously, the BERR signal may be asserted by external circuitry for indicating the failure of one of the peripheral devices to respond with a DTACK signal during a bus cycle. During an interrupt acknowledge bus cycle, if none of the peripheral devices responds with a DTACK signal or VPA signal, then a false or spurious interrupt has occurred. This may happen, for example, when there is noise on the lines coupled to the interrupt input terminals (IPL0, IPL1 and IPL2) or if other hardware problems should occur. In this event, conductor 94 conducts a logic "1" level such that exception priority block 66 generates a new "ADDRESS 0" on lines 70 which is selected by multiplexer 68. A separate microinstruction routine in the control store is initiated when a bus error occurs during an interrupt acknowledge cycle since the occurrence of a bus error during an interrupt acknowledge cycle would not affect normal processing. The microinstruction routine initiated by the occurrence of a spurious interrupt causes a fixed vector number to be internally generated by the data processor in order to direct control to a service routine specified in the vector table.

Exception priority block 66 also generates an output coupled to conductor 96 for controlling the selection of a vector number within control unit 32. Control unit 32 includes a field translate unit (FTU) which, among other things, creates an address within the interrupt vector table based upon the vector number of interrupt priority level as will be explained below in connection with FIGS. 5 and 6.

Finally, control unit 32 is coupled by conductor 98 to exception priority block 66 to provide for a trace mode of operation. The program status word (PSW) within control unit 32 includes a TRACE bit which when set indicates that a trace mode is pending. When the TRACE bit is set, exception priority block 66 causes the data processor to initiate a special microinstruction routine in the control store at the next macroinstruction boundary rather than executing a following macroinstruction. Exception priority block 66 also causes the field translate unit to generate a vector number corresponding to the address in the vector table at which is stored the address of a service routine for implementing the trace functions. Various other input signals are received by exception priority block 66 in order to direct control to special microinstruction routines in the data processor control store. Conductor 62 is coupled to exception priority block 66 for indicating the reset condition. Conductor 90 is also coupled to exception priority block 66 for indicating a bus error condition.

Decode logic block 80 is coupled by conductor 100 to exception priority block 66 for indicating an addressing error. An address error exception occurs when the processor attempts to access a word (16 bits) or a long word (32 bits) operand at an odd address (least significant address bit equal to logic "1"). In the event that bus error, address error or reset is indicated, it is desirable to transfer control to special microinstruction routines immediately rather than waiting until the next macroinstruction boundary. Therefore, the bus error, address error and reset signals are also coupled to decoder 102 which generates a starting address on lines designated 104 which are coupled through multiplexer 68 to the control store. In the event of a bus error, address error or reset condition, multiplexer 68 selects the starting address on conductor 104 without waiting for the previous microinstruction sequence to finish.

The user supplied clock signal (CLK) is supplied to a first clock generator 71 which in turn generates out of phase clock signals ($\phi 1$ and $\phi 2$). These signals are used throughout the remainder of the system in order to provide basic timing and are also applied to first and second inputs of a second clock generator 73. The BERR signal is applied to clock generator 73 via conductor 90 and a clock enable signal from decode logic 80 is supplied to clock generator 73 via conductor 75. Clock generator 73 generates special timing sequences T1, T2, T3 and T4 which are used by the remainder of the system.

Figure 5:
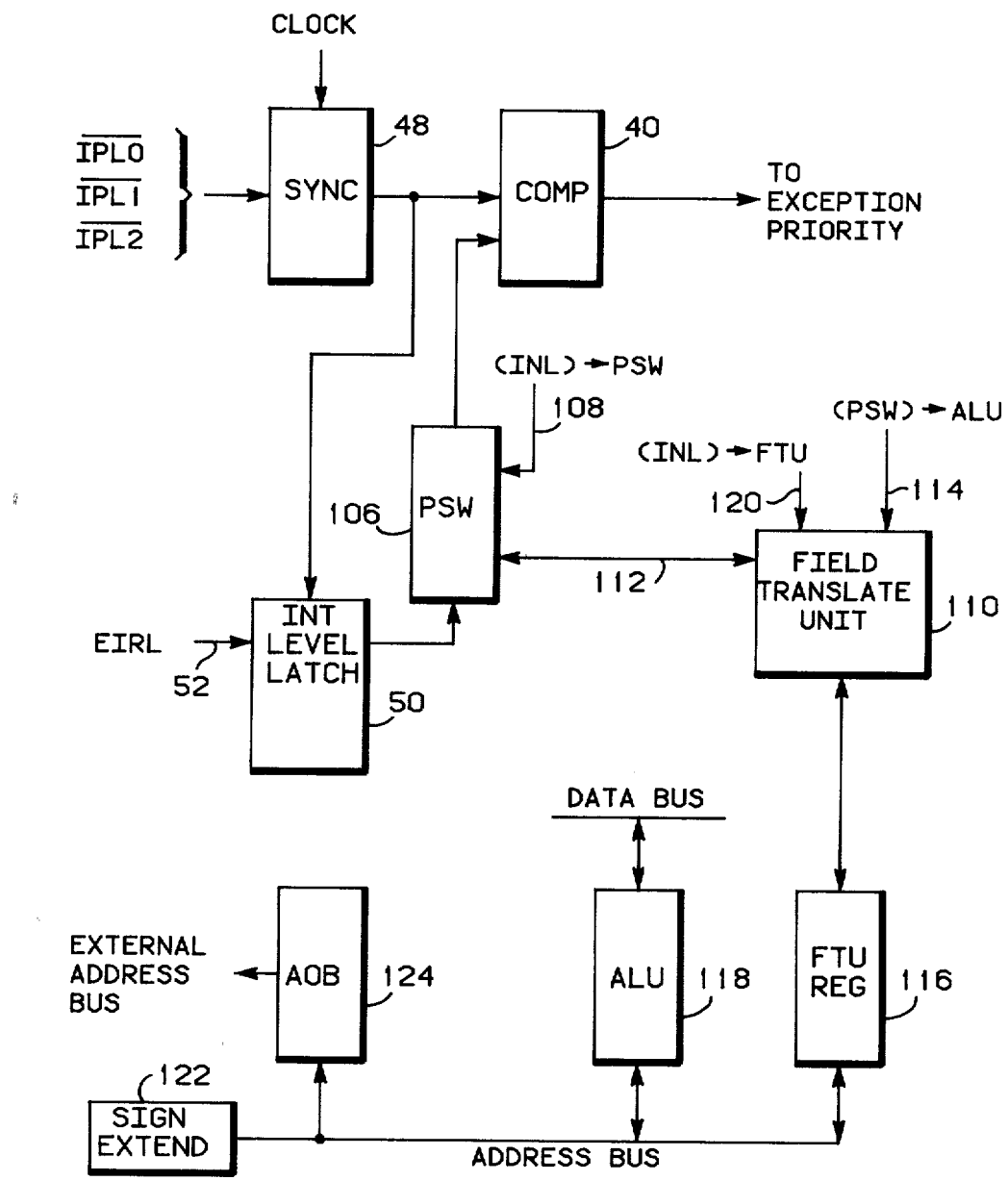
FIG. 5 is a more detailed block diagram which illustrates the interrupt level priority portion of the system shown in FIG. 2.

FIG. 5 is a block diagram which illustrates in greater detail the circuit blocks of the data processor which relate to controlling the interrupt level. As in FIG. 2, the interrupt priority level signals are synchronized by block 48 and thereafter coupled to comparator 40 and interrupt level latch 50. The output of interrupt level latch is coupled to one input (3 lines) of processor status word 106 (PSW). FIG. 6 illustrates the format of the 16 bit PSW. Bits 8–10 are used to store the current processor operating level. Bit 15 (T) is a trace enable, and bit 13 (S) indicates supervisor user state. Bits 0–4 (C=Carry, V=Overflow, Z=Zero, N=Negative and X=Extend) represent other processor condition codes.

Bits 8–10 of the output of PSW 106 are coupled to comparator 40 as was described in connection with FIG. 2. A control signal derived from the control store is coupled to conductor 108 for allowing bits 8–10 of PSW 106 to be updated with the output of interrupt level latch 50. However, prior to changing bits 8–10 of PSW 106, the current status of bits 8–10 must be saved such that the data processor operating level can be returned to its current state after the pending interrupt has been processed. Current status of PSW 106 is saved by first coupling the 16 bit output of PSW 106 to field translate unit 110 over lines 112. A control signal derived from the control store is received by field translate unit 110 on conductor 114 which causes the contents of PSW 106 to be transmitted through field translate unit 110 and FTU register 116 to arithmetic logic unit (ALU) 118 for temporary storage. At a later time during the processing of the interrupt, the value temporarily stored can be transmitted to the external data bus for storage in a supervisor stack area of memory.

As mentioned previously, the priority level of the interrupt being recognized is forced upon bits A1-A3 of the external address bus during the interrupt acknowledge bus cycle. This is accomplished by coupling the three bit output of interrupt level latch 50 to field translate unit 110. A control signal derived from the control storage is received by field translate unit 110 on conductor 120 for enabling the output of interrupt level latch 50 through FTU register 116 and onto the internal data processing address bus. During an interrupt acknowledge bus cycle, sign extend logic 122 forces address bits 4-24 to be logic "1" while bits 1-3 reflect the contents of the interrupt level latch 50. The internal address bus is then coupled to address output buffers 124 for driving the external address bus.

Figure 7:
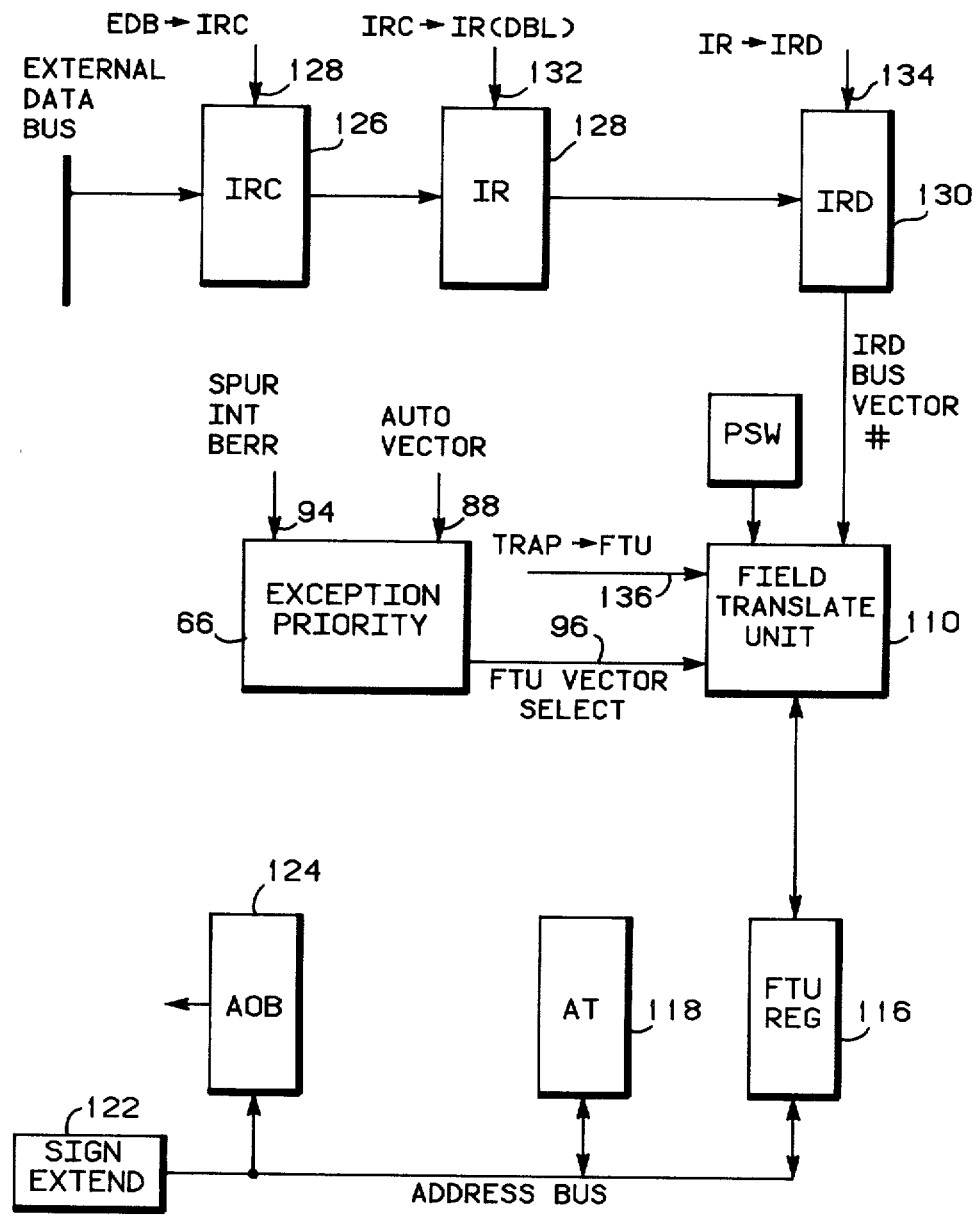
FIG. 7 is a more detailed block diagram which illustrates that portion of the system shown in FIG. 2 which accesses an appropriate service routine.

In FIG. 7, a more detailed block diagram illustrates the circuit blocks which generate an address in the interrupt vector table which contains a pointer to the appropriate service routine. First, regarding vectored interrupts, the interrupting peripheral device forces its vector number onto the external data bus and this is received by IRC instruction register 126. The format of the vector number which appears on the external data bus is illustrated in FIG. 8. V7 is the most significant bit (MSB) of the vector number and V0 is the least significant bit (LSB) of the vector number. The vector numbers contained in bits D0-D7, and bits D8-D15 are ignored.

A control signal derived from the control store is coupled by conductor 128 to IRC register 126 for enabling the transfer of information on the external data bus into the register. The output of IRC register 126 is coupled to the input of IR register 128, the output of which is in turn coupled to IRD register 130. Registers 128 and 130 are similarly controlled by signals derived from the control store and received over conductors 132 and 134, respectively. During normal execution of macroinstructions, the series of instruction registers 126, 128 and 130 are structured so as to permit pipelined operation. However, during normal interrupt processing, the vector number is transmitted through this series of registers to the field translate unit 110. In the absence of an indication of a spurious interrupt or an auto-vector condition, exception priority block 66 generates an output on FTU vector select lines 96 such that the output of IRD register 130 is enabled into field translate unit 110. Field translate unit 110 translates the 8 bit vector number into an address. The vector number is shifted two bit positions to the left, effectively multiplying the vector number by four. Bits A2-A9 correspond to the 8 bit vector number while bits A10-A23 are all logic "0". The format of this translated address is illustrated in FIG. 9 where V0-V7 represent the vector number.

In the preferred embodiment, vector numbers supplied by interrupting peripheral devices range from 64 through 255 such that the resulting address generated by field translate unit 110 ranges from 256 through 1020. The address space between address "0" through "255" is reserved for auto-vectored interrupts, spurious interrupts and other exception conditions. The vector table shown in FIG. 10 illustrates the assignment of vector numbers and addresses to the various conditions which alter normal execution of macroinstructions.

The above discussion applies to vectored-type interrupts. In the event of an auto-vectored interrupt indicated by a control signal on conductor 88, exception priority block 66 instructs field transmit unit 110 to utilize the three bit PSW output to generate the proper address in the vector table. As can be seen from the vector table in FIG. 10, an auto-vectored interrupt internally generates a vector number within the data processor equal to 24 plus the priority level latched by interrupt level latch 50. This vector number is then translated into an address as in the case of a vectored interrupt. Similarly, in the event of a spurious interrupt as indicated by a control signal on conductor 94, field translate unit 110 is caused to internally generate a vector number of 24 which is similarly translated into an address.

The data processor is adapted to recognize a TRAP macroinstruction whereby the user software can initiate exception processing. In the event of a TRAP macroinstruction, the field translate unit 110 generates a vector number internally based upon the least significant four bits of the macroinstruction, a copy of which is contained in IRD register 130. The vector number is equal to 32 plus the binary code in the four least significant bits of the macroinstruction. The vector number is then translated into an address as previously described. A control signal derived from the control store is received by field translate unit 110 on conductor 136 for indicating the presence of a TRAP macroinstruction.

In all of the above mentioned cases, the address formed by the field translate unit 110 is coupled to FTU register 116 and transferred to adjust register 118. After the data processor has saved the contents of the working registers and processor status word on the supervisory stack area and memory, the address temporarily stored in register 118 is coupled by the address bus to the address output buffers 124 for driving the external address bus in order to obtain the vector address stored in the vector table. The vector address is accessed as four 8 bit bytes which are loaded into the data processor program counter in order to begin execution of the appropriate service routine.

Referring to FIG. 11, there is shown a portion of the circuitry contained in synchronizing block 48. Input signals $\overline{VPA}$, $\overline{BE}$, $\overline{IPL0}$, $\overline{IPL1}$ and $\overline{IPL2}$ are each applied to inverting type synchronizing circuits 140. The details of this circuit are only shown in the upper most portion since each of the synchronizing circuits is identical. These circuits synchronize the input signals with respect to timing and amplitude and provide at their outputs VPAI, BEI, IS0, IS1 and IS2.

Figure 12B:
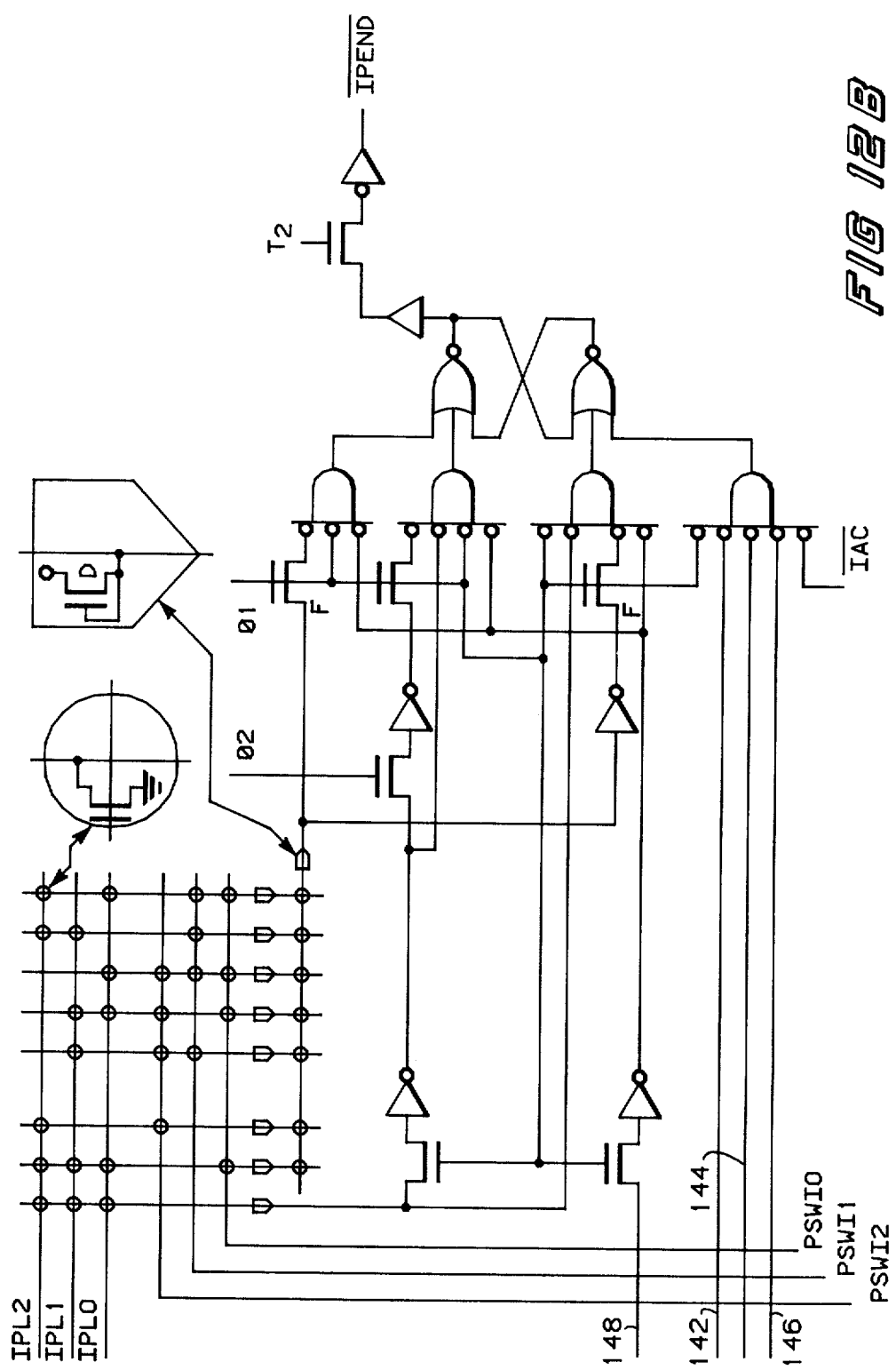

FIGS. 12A and 12B illustrate the circuitry for generating the interrupt pending signal (IPEND), and FIG. 13 illustrates the proper orientation of FIGS. 12A and 12B. As can be seen, interrupt priority level signals IS0, IS1 and IS2 are clocked into the logic in FIG. 12A by clock $\phi 2$. The resulting signals (IPL0, IPL1 and IPL2) are applied to a programmable logic array (PLA) shown in FIG. 12B where they are compared with the operating level bits PSWI, PSWI1 and PSWI2. If the interrupt level is higher than the current operating level of the system, the interrupt pending signal ($\overline{IPND}$) is generated at time T2 The circuitry shown in FIG. 12A includes means for detecting a level "7" interrupt level on conductors 142, 144 and 146 which is forwarded to nonmaskable interrupt (NMI) logic in FIG. 12B. These signals are likewise applied to the PSW register in control unit 32. The nonmaskable interrupt logic signals are gated with the interrupt acknowledge signals (IAC) in order to determine the presence of a level "7" interrupt. An additional signal is generated by AND gate 150 over conductor 148 which indicates that the input signals are stabilized so that an accurate comparison can be made.

Figure 14B:
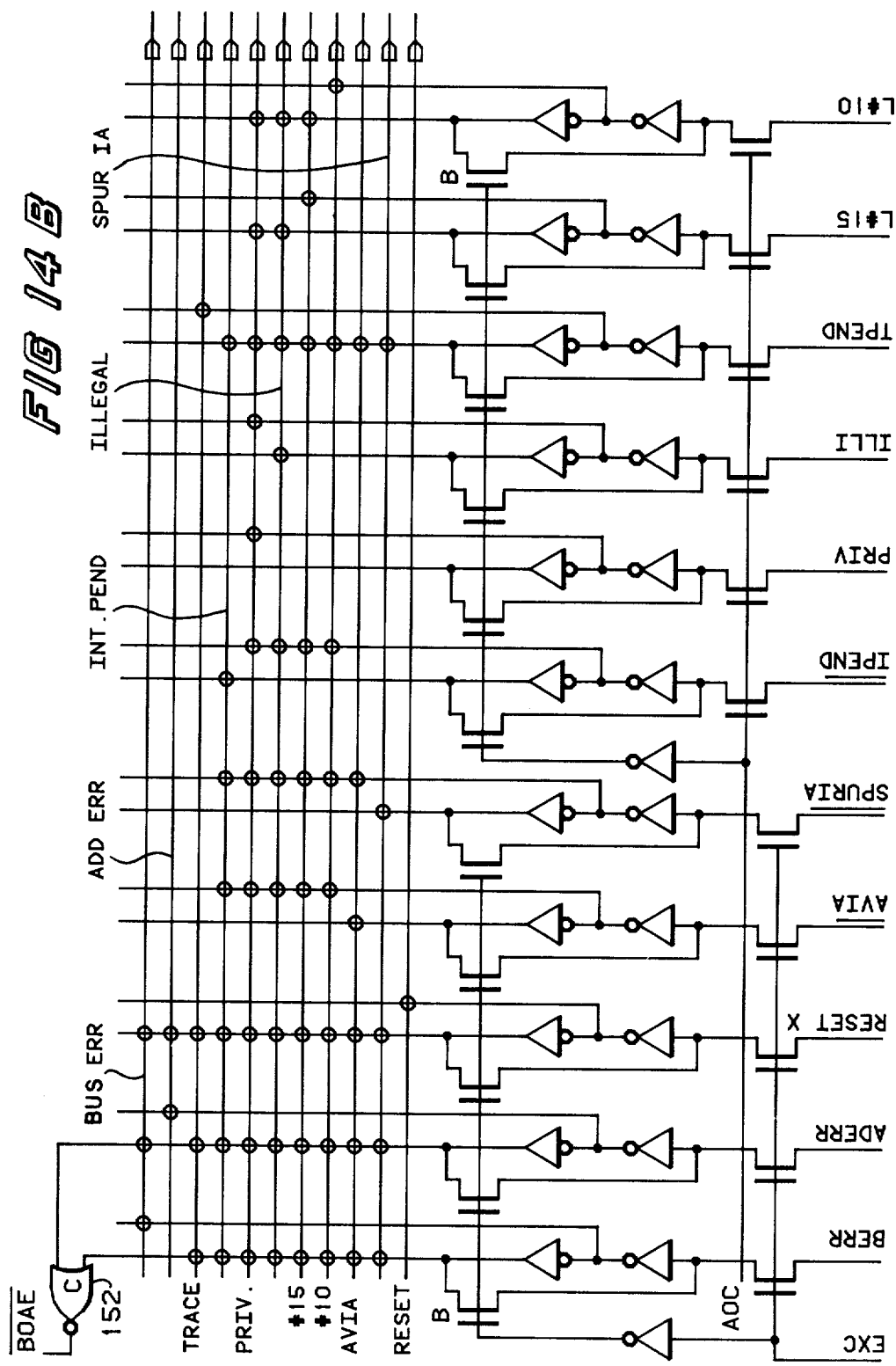

FIGS. 14A, 14B and 14C illustrate a portion of the exception priority logic which functions to update the exception priority register. FIG. 15 illustrates the proper orientation of FIGS. 14A, 14B and 14C. Referring to FIG. 14A, signal EIRL, previously discussed, is processed and the resulting signal applied to an inverting gate 151 which is enabled at time T3. The resulting signal (AOC) indicates that an exception condition is to be processed at the macroinstruction boundary. Additionally, signals MR1 and MR4 which are control signals generated in control unit 32 are applied to the circuitry to generate a second signal EXC which indicates that an exception should be processed prior to the next microinstruction.

Referring now to FIG. 14B, there is shown a PLA into which are supplied various exception condition indicating signals. Those conditions which must be processed prior to the next microinstruction are BERR (bus error), ADERR (address error), RESET X (reset), AVIA (auto vector interrupt acknowledge) and SPURIA (spurious interrupt acknowledge). Those conditions which are processed between macroinstructions are PRIV (privilege instruction), ILLI (illegal instruction), TPEND (trace pending), and L15 and L10 which are program generated exceptions. A signal (BOAE) is generated at the output of NOR gate 152 which indicates the occurrence of either a bus or address error.

Signals produced by the circuitry in FIG. 14B are further processed by the circuitry in FIG. 14C. As can be seen, one output (four lines) is sent to the TRAP vector decoder (FTU vector select 98 in FIG. 2). An "ADDRESS 1" select signal (A1S) is applied to the circuitry in FIG. 14C so as to gate the "ADDRESS 1" bits from the instruction decoder to microrom address logic in control unit 32.

FIG. 16 is a logic diagram illustrating the contents of decoder 86 shown in FIG. 2. Signal VPAI is inverted by inverter 156 the output of which forms a first input to gate 158. Signal IAC is applied to a first input of gate 160 and to the second input of gate 158. Signal BEI is enabled through device 162 by clock signal $\phi2$ and is applied to inverting gate 164. Upon the occurrence of $\phi1$, device 166 turns on and the signal is applied to the series arrangement of inverters 168 and 170. At the next occurrence of $\phi2$, device 172 turns on and applies the signal to the second input of gate 160. When the next T4 signal occurs, devices 174 and 176 couple the output of gates 158 and 160 respectively to inverters 178 and 180 respectively to form the AVIA and SPURIA signals. These signals are then applied to exception priority logic 66.

Figure 17A:
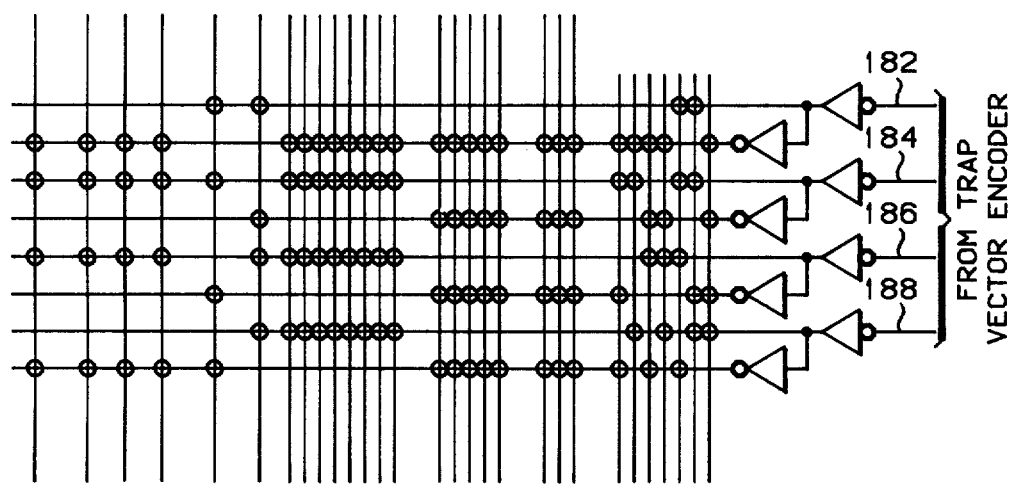
FIGS. 17A, 17B, 17C, and 17D illustrate a portion of the field translation logic.
Figure 18:
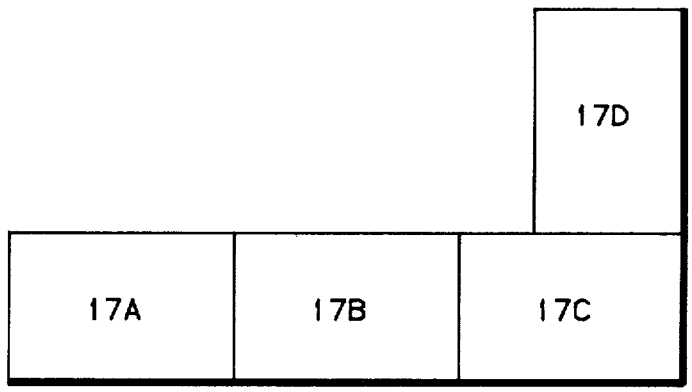
FIG. 18 illustrates the proper orientation of FIGS. 17A, 17B, 17C and 17D.
Figure 17B:
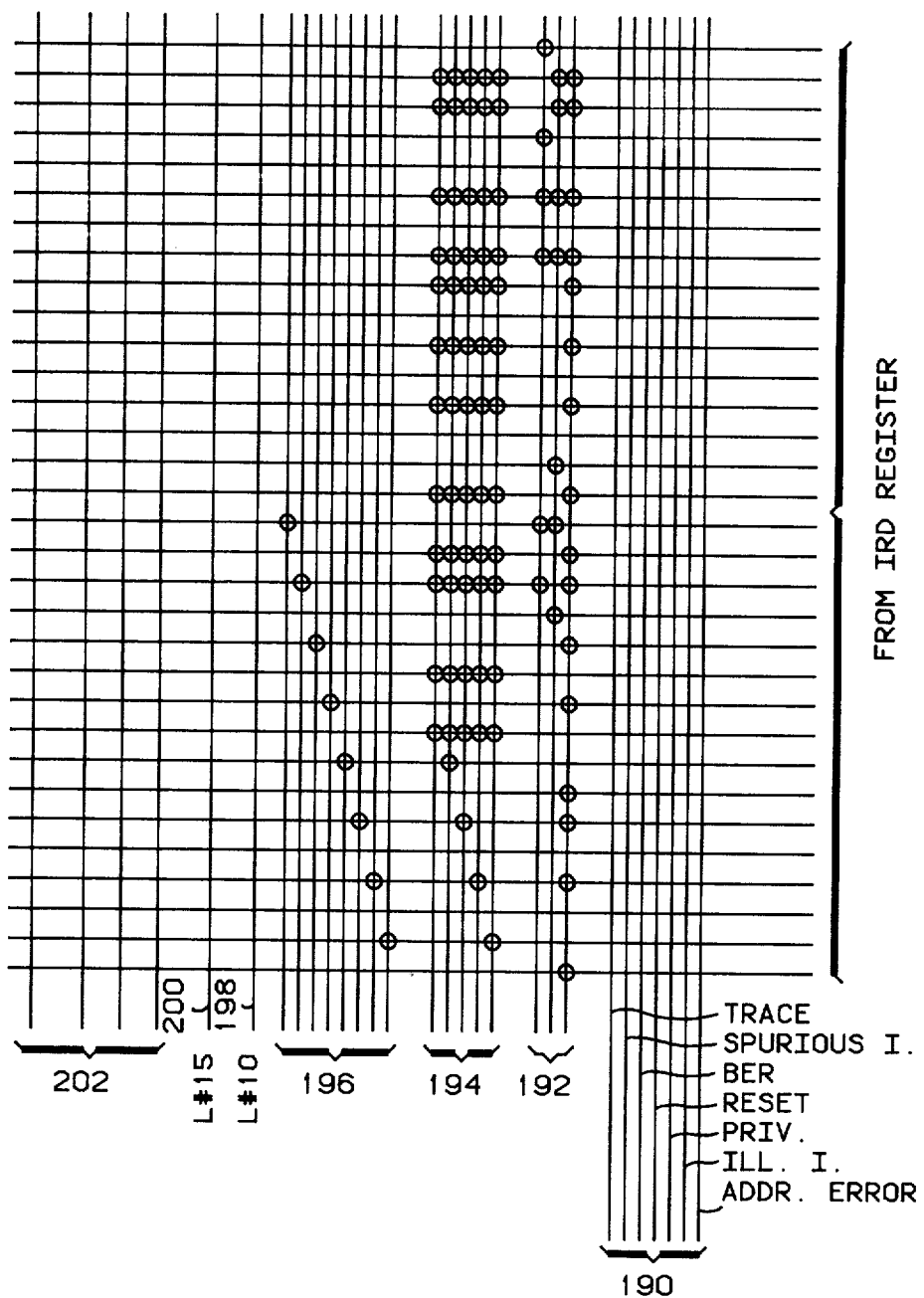
Figure 17C:
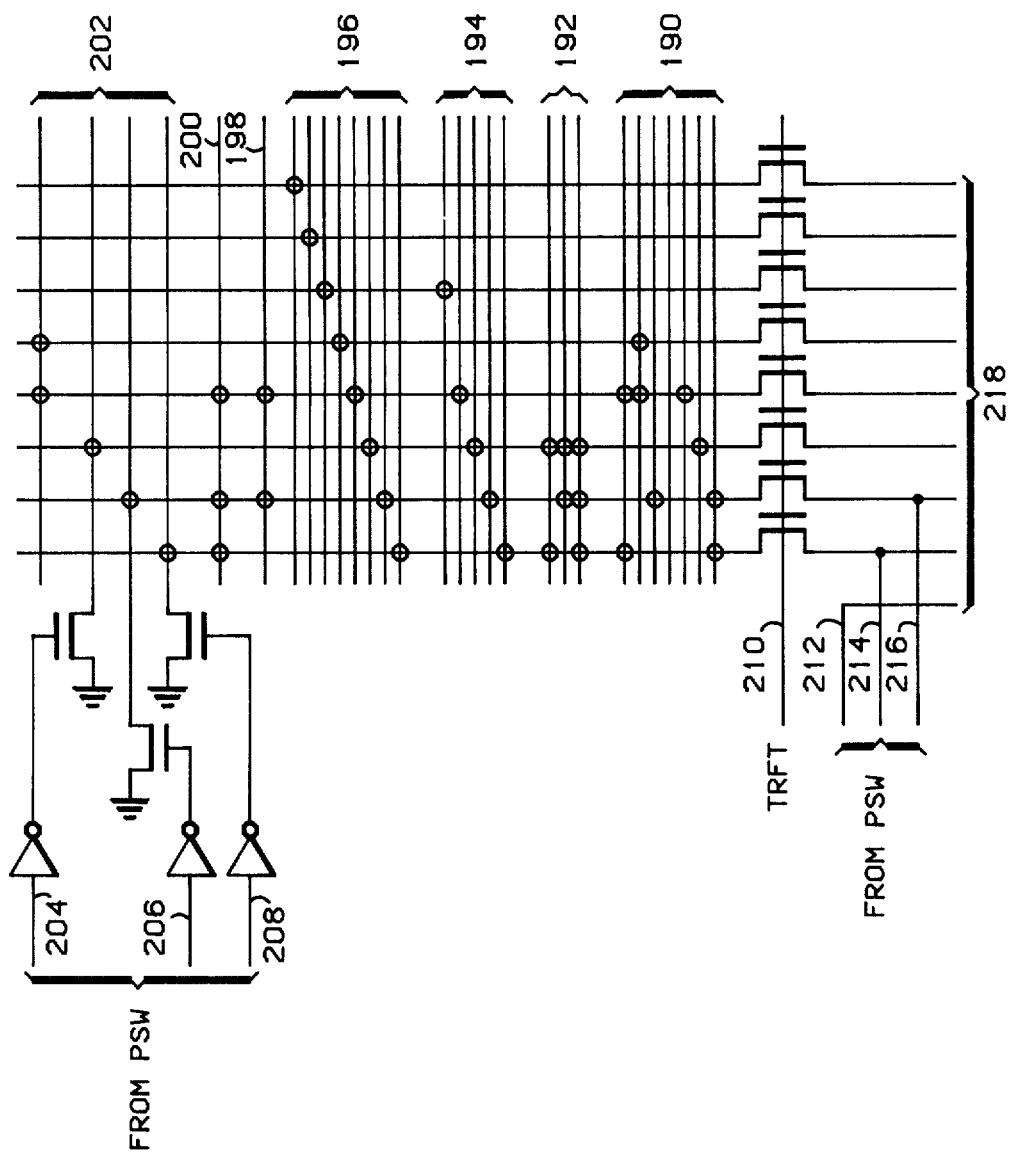
Figure 17D:
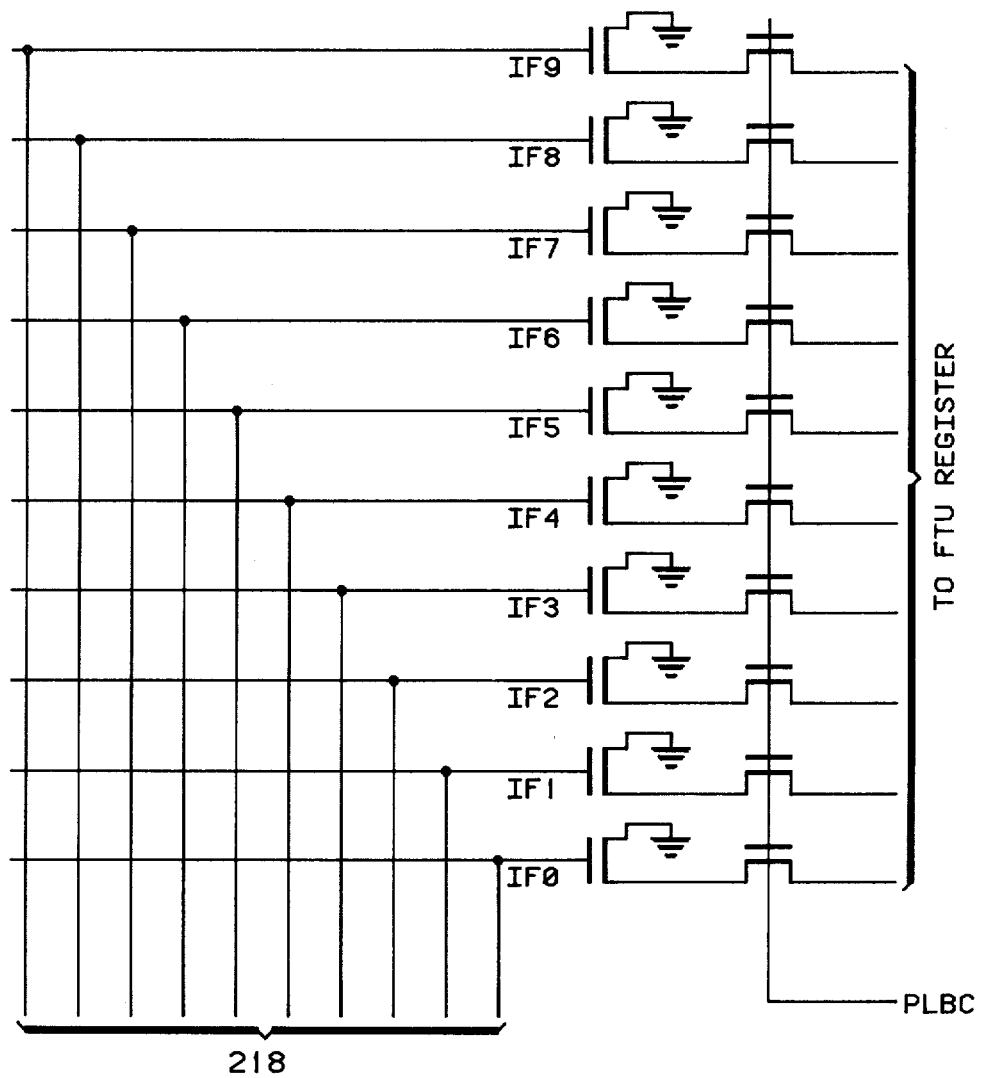

FIGS. 17A, 17B, 17C and 17D illustrate a portion of the logic circuitry in the field translation unit which relates to address translation for an exception condition, and FIG. 18 illustrates the proper orientation of FIGS. 17A-D. Referring to FIG. 17A, it can be seen that the FTU vector select signals (96 in FIG. 2) from the TRAP vector encoder are applied to a PLA via conductors 182, 184, 186 and 188. The outputs from this PLA are applied to the PLA in FIG. 17B as are signals from IRD register 130 (FIG. 7). A first group of outputs 190 correspond to exception condition address translations for the following functions: trace, spurious input, bus error, reset, privilege instruction, illegal instruction and address error. A second group of outputs 192 correspond to divide by zero, check and trap on overflow. Outputs 194 correspond to address translation for a trap instruction, outputs 196 correspond to address translation for a vector number, and outputs 202 correspond to a translation for a autovector number. Outputs 198 and 200 relate to translations for the L10 and L15 exceptions briefly described above. These outputs are applied to additional PLA logic in FIG. 17C as are inputs from the PSW register via conductors 204, 206, 208, 212, 214 and 216. Signal TRFT which is applied via conductor 210 is generated in the control unit and permits the translated address to be placed in the field translate unit. The outputs 218 are applied to the logic circuitry shown in FIG. 17D which is designed to convey the address translation in the field translation unit to FTU register 116.

The above description is given by way of example only. Changes in form and details may be made by one skilled in the art without departing from the scope of the invention as defined by the appended claims.

We claim:

1. In a data processor for executing operations upon digital information in response to a plurality of instruction programs, an interrupt circuit comprising:

first means adapted for coupling to first and second types of circuitry external to the data processor, for receiving interrupt signals from both the first and second types of external circuitry representing requests to interrupt the execution of an instruction program currently being executed by the data processor in order to execute another of the plurality of instruction programs;

second means adapted for coupling to the first type of the external circuitry, for receiving from the first type of external circuitry a vector number indicative of a vector address within a predetermined portion of the address space of the data processor which contains an address vector comprising an address within one of the plurality of instruction programs;

third means coupled to the first means and having an output adapted for coupling to the first and second types of external circuitry, for providing, in response to the interrupt signal, a granting signal to the first and second types of external circuitry indicating that the interrupt request has been granted by the data processor;

fourth means having an input adapted for coupling to the first type of external circuitry, for receiving a first acknowledgement signal provided by the first type of external circuitry indicating that a vector number has been provided to the second means, and for latching, in response to the first acknowledgement signal, the vector number received by the second means;

fifth means having an input adapted for coupling to the second type of external circuitry, for receiving a second acknowledgement signal provided by the second type of external circuitry indicating that a vector number has not been provided to the second means, and for providing, in response to the second acknowledgement signal, a predetermined vector number independent of any vector number received by the second means; and sixth means coupled to the fourth and fifth means, for generating the vector address indicated by the vector number provided by the fifth means is so provided and the vector address indicated by the vector number latched by the fourth means otherwise.

2. A data processor according to claim 1 wherein the interrupt signals received by the first means are representative of a priority level associated with the external circuitry which requested an interrupt, and the vector number provided by the fifth means is in a predetermined relationship to the priority level associated with the external circuitry which requested the interrupt.

3. A data processor according to claim 2 further comprising:

seventh means coupled to the first means and adapted for coupling to the first and second types of external circuitry, for providing to the first and second types of external circuitry a priority level associated with the external circuitry for which the granting signal is generated by the third means.

4. The data processor of claim 2 wherein the data processor further comprises a register for storing a priority level associated with the instruction program currently being executed thereby, and wherein the interrupt circuit further comprises seventh means coupled to the sixth means and to the register, for interrupting the execution by the data processor of the instruction program currently being executed thereby when the priority level of such instruction program is lower than the priority level associated with the external circuitry for which the granting signal has been generated by the third means, and thereafter forcing the data processor to begin execution of the one of the plurality of instruction programs whose address comprises the address vector in the vector address generated by the sixth means.

* * * * *